No. 649,496. Patented May 15, 1900.
D. W. TROY.
AUTOMATIC CUT-OFF MECHANISM FOR WATER PIPES.
(Application filed Sept. 9, 1899.)
(No Model.)
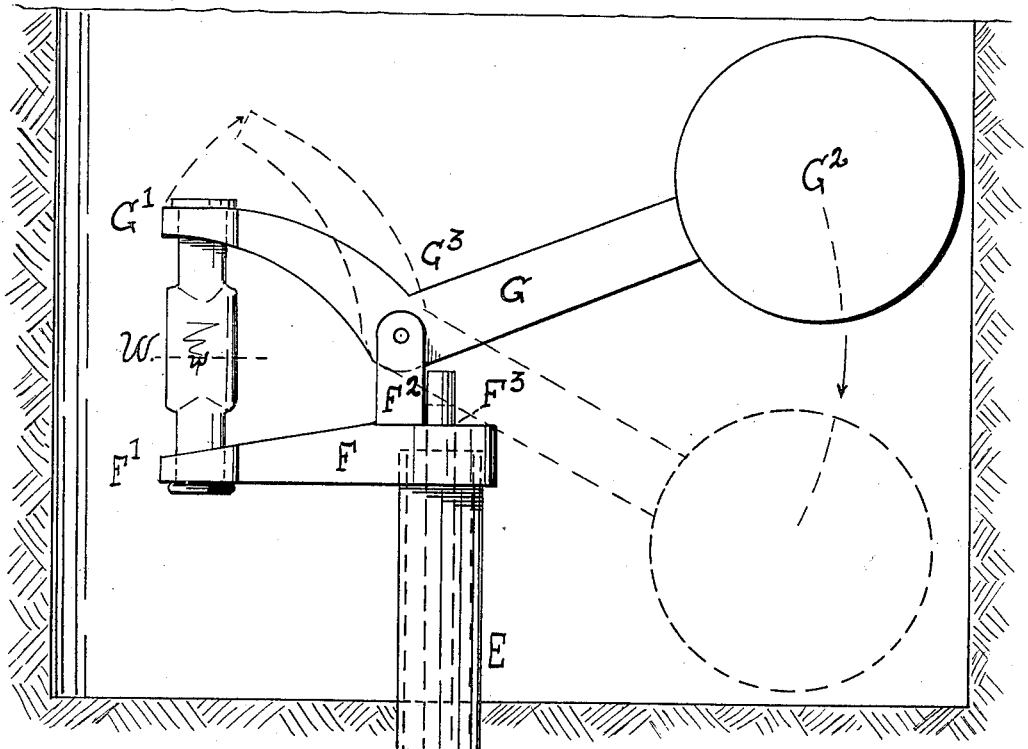
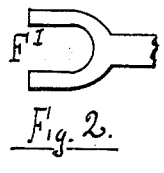
Fig. 2.
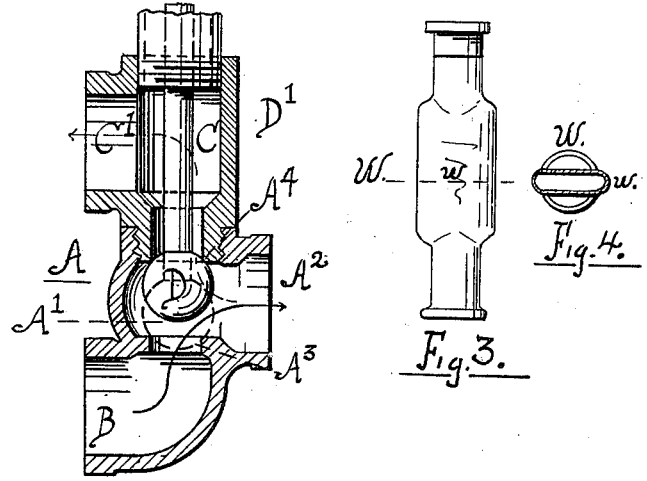
Fig. 3.
Fig. 1.
Witnesses:
David W. Fuller.
Jno. W. Lee
Inventor:
Daniel W. Troy.

UNITED STATES PATENT OFFICE.

DANIEL W. TROY, OF MONTGOMERY, ALABAMA.

AUTOMATIC CUT-OFF MECHANISM FOR WATER-PIPES.

SPECIFICATION forming part of Letters Patent No. 649,496, dated May 15, 1900.

Application filed September 9, 1899. Serial No. 729,933. (No model.)

*To all whom it may concern:*

Be it known that I, DANIEL W. TROY, a citizen of the United States of America, residing at Montgomery, in the county of Montgomery and State of Alabama, have invented certain new and useful Improvements in Automatic Cut-Off Mechanisms for Water-Pipes, of which the following is a specification, reference being had to the accompanying drawings, forming a part hereof.

My invention relates to that class of cut-off mechanisms or stop and waste cocks which are employed to automatically drain house water-pipes and at the same time shut off supply from service-pipes when the temperature falls to a predetermined point.

It relates further and particularly to that class of such cut-off devices which make use of the bursting of a liquid-containing valve-controlling vessel or cartridge of glass or other material which will break when its contents freeze as the releasing agent for the valve mechanism, as was broadly patented to me heretofore on June 22, 1897.

One object of my invention is to provide a form of cartridge which will fracture reliably at the predetermined temperature and which will allow a perfect separation of its parts for the purpose of releasing the valve mechanism.

A further object is to provide means for regulating the temperature at which such cartridge will operate to release said mechanism.

A further object is to provide a more efficient form of valve mechanism which will be unaffected in its action by corrosion and which will be reliable and so constructed that new cartridges can be readily replaced in position by unskilled hands with the minimum of care.

My invention consists in so constructing the frangible liquid-containing valve-controlling cartridge that certain parts thereof will have less resistance to internal strain than the rest of said cartridge, and thus insuring the fracture of said cartridge at such weaker points and consequent separation of its parts at such points, as will be hereinafter more particularly described.

My invention consists, further, in regulating the temperature at which such cartridge shall freeze and burst by the use of containing liquids of various freezing temperatures, such as saline solutions.

My invention consists, further, in the valve mechanism and in the combination and construction of parts, as hereinafter set forth and described.

Figure 1 shows my valve mechanism with the modified cartridge in position and representing the valve-casing in section and shows by dotted lines the position of the parts after fracture of such cartridge. Fig. 2 shows a top view of the jaw in end of lever and arm. Fig. 3 shows my modified cartridge, and Fig. 4 shows a cross-section of the central part of such modified cartridge.

Referring to Fig. 1, A is a valve-casing having a central chamber $A'$, provided with discharge-outlet $A^2$ to house-pipes and with valve seats or openings $A^3$ and $A^4$ for supply and waste, respectively.

B is a passage for flow from service-pipe, and C is a passage for discharge of waste water from $A^4$ out through a side opening $C'$, to which a waste-pipe will be attached leading to sewer, &c.

D is a valve (preferably a ball of rubber or like material) carried on a valve-rod $D'$ and adapted to close either supply-seat at $A^3$ or waste-seat at $A^4$, as said valve is up or down. To the upper end of passage C is screwed a pipe E, carrying at its upper end an arm F. Said arm F is provided with a jaw $F'$ at its outer end and with lugs extending upward, one of which is shown at $F^2$, between which lugs is pivoted a weighted lever G. F is also provided with an opening $F^3$, concentric with the valve D and seats $A^3$ and $A^4$. The lever G is provided at its short end with a U-shaped jaw $G'$, in which jaw and in the similar concentric jaw $F'$ in the arm F is engaged a suitable cartridge W, which restrains the upward movement of the said short end of G. The longer end of G is provided with a weight $G^2$, sufficiently heavy to force down the valve-rod $D'$, which extends up through the opening $F^3$ against the highest water-pressure likely to be found in the mains to which the apparatus is attached. G is free to move in a vertical plane on a pin $G^3$, extending through G and the lugs $F^2$ and forming a pivot. When the lever is held up, as shown, by the cartridge W, so that the valve-rod may rise to the limit of its motion, the valve D will be firmly seated against seat $A^4$ by the water-pressure beneath said valve D and there will be a free flow through passage B, chamber $A'$, and discharge-outlet $A^2$ to the house-piping. Should the restraining-cartridge be fractured by freezing of its contents, the weighted lever descends and forces D down upon seat $A^3$, thus shutting off the supply and at the same time opening a waste flow from $A^3$ through $A^2$, passage C, and thence to sewer through outlet $C'$.

The shape of the cartridge-holding jaws is clearly shown in Fig. 2 for convenience, as it is not herein claimed.

Fig. 3 shows my modification of the cartridge or liquid-containing vessel. I provide at $w$ surfaces flattened or given larger radius of curvature than the rest of the cartridge for the purpose of reducing the resistance of the cartridge to internal strain at such point $w$, and thus insuring its fracture at such points when its contents freeze. The effective pressure being much greater against these flat surfaces than on the cylindrical surface of the cartridge or against the small thick ends, it bursts at the weak points, and being under tension the effect of a break at said points is to cause the separation of the end portions at the moment of fracture. It is obvious that thinner surfaces here would answer the same purpose to a certain degree and that a bulb in the cartridge would have a like effect by increasing the effective bursting stress.

In order to regulate the temperature at which the cartridge will act, I use saline or other solutions the freezing temperature of which can be regulated by varying their strength.

My construction allows the valve-mechanism part of my device to be safely buried below danger from cold, while the cartridge-holding part may be carried in a small box or well at the ground-level, where a covering provided with air-admitting orifices may be provided to protect the parts from accidental damage and which can be readily removed for the insertion of new cartridges, the only operation necessary in inserting a new cartridge being to lift the lever G and insert cartridge in jaws when the mechanism is "set."

As a frangible valve-controlling liquid-containing cartridge in connection with a valve mechanism and the converse has already been patented, broadly, by me, I do not here claim such combination.

What I claim is—

1. In a frangible liquid-containing cartridge for valve mechanisms and the like, certain parts structurally weakened against internal pressure, whereby said cartridge will break at such parts upon the freezing of its contents, substantially as described.

2. In a liquid-containing, valve-controlling cartridge, adapted to break when its contents freeze, parts between the ends of such cartridge structurally weakened against internal pressure, whereby said cartridge will fracture at such parts when its contents freezes, substantially as described.

3. In a frangible liquid-containing cartridge for valve mechanism and the like, relatively-large, flattened surfaces, which will be weaker against internal pressure, and which will fracture before the rest of said cartridge from the freezing of its contents, substantially as described.

4. In a frangible liquid-containing cartridge, contained liquids, having lower freezing temperature than water, whereby the temperature of fracture of such cartridge may be regulated, substantially as described.

5. In a cut-off mechanism controlled by a frangible, liquid-containing cartridge, the combination of a supply and waste valve normally held open as to supply and closed as to waste by water-pressure, and a weighted lever which will operate said valve so as to close supply and open waste, normally held inoperative by such frangible cartridge, substantially as described.

6. In a valve mechanism controlled by a frangible liquid-containing cartridge the combination of a valve-chamber having supply and waste seats and a discharge-opening, a valve contained in said chamber which will close either supply or waste openings alternately, a valve-rod attached to said valve, a weighted lever which will operate said valve when released and normally held inoperative by such frangible cartridge, substantially as described.

7. In a cut-off mechanism controlled by a frangible liquid-containing cartridge a weighted lever adapted to operate such mechanism, and normally held inoperative by such cartridge, substantially as described.

8. In a valve mechanism controlled by a liquid-containing cartridge which will break on the freezing of the contents, the combination of a supply and waste valve normally held open as to supply and closed as to waste by water-pressure, a valve and valve-rod, operated by a weighted lever, a weighted lever which will operate such valve through such valve-rod, and be normally held inoperative by said frangible cartridge, and be released upon the freezing of the contents of such cartridge, substantially as described.

DANIEL W. TROY.

Witnesses:
DAVID W. W. FULLER,
JNO. W. LEE.